S. TOMPKINS.
RAILWAY CAR BRAKE.
APPLICATION FILED MAR. 26, 1913.
1,108,815.
Patented Aug. 25, 1914.
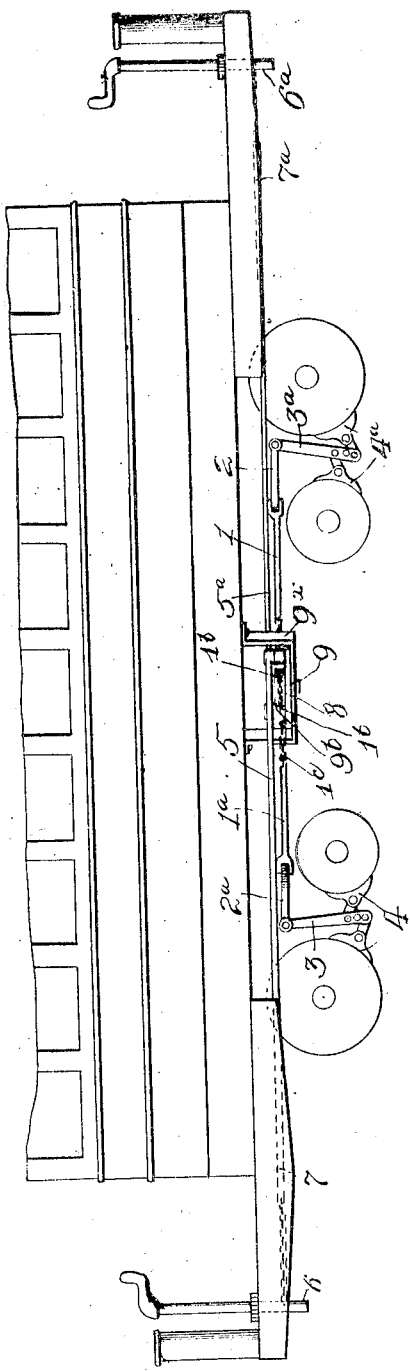
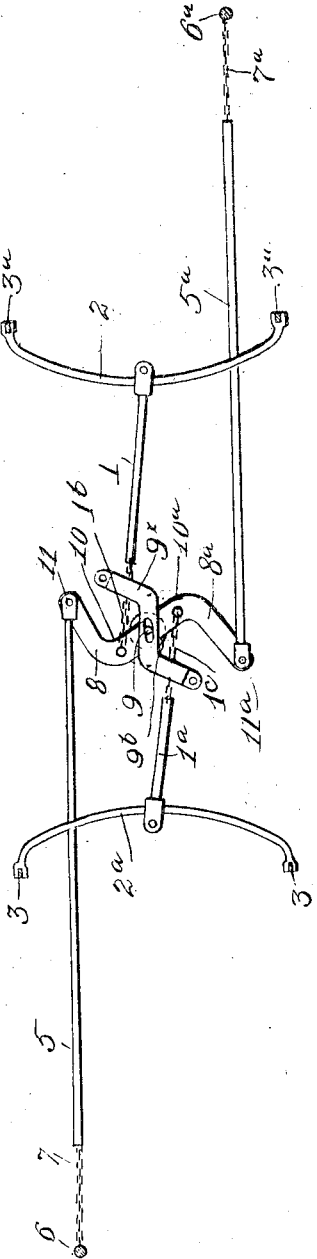
WITNESSES
INVENTOR,
Stonewall Tompkins
By Knight Bros
Attorneys.

UNITED STATES PATENT OFFICE.

STONEWALL TOMPKINS, OF BROOKLYN, NEW YORK.

RAILWAY-CAR BRAKE.

1,108,815.
Specification of Letters Patent. Patented Aug. 25, 1914.
Application filed March 26, 1913. Serial No. 757,033.

*To all whom it may concern:*

Be it known that I, STONEWALL TOMPKINS, a citizen of the United States, residing at Brooklyn, in the county of Kings and State of New York, have invented certain new and useful Improvements in Railway-Car Brakes, of which the following is a specification.

This invention relates to railway car brakes of the type employing a lever to which power is applied and from which power is transmitted to the brake to be operated, and has for its object to so construct the lever that its point of transmission moves in an arc such that the direction of motion of the point shall be at an angle of less than 90 degrees from the direction of the force transmitted, during the first part of the braking movement when the slack is being taken up but which angle shall continually increase toward 90 degrees as the braking pressure is increased, thereby permitting not only quick application of the brakes with a minimum range of operating movement, but insuring ample power in developing the actual braking pressure; said brake lever being preferably constructed to cause its power receiving point to move in an arc such that the direction of motion of the point shall be at an angle of less than 90 degrees from the direction of the force received, said angle to continually decrease toward 0 degrees, or even to a negative value, as braking pressure is increased, and said last named arc also preferably having a much greater radius than the arc of the point of transmission.

According to the preferred embodiment of the invention herein disclosed for purposes of illustration, the general position of the new construction of lever is approximately perpendicular to the line of application of power, when the full braking pressure is being applied, but the lever is deflected so as to provide two legs, one of which, extending from the fulcrum to the power transmission point, is at a considerable angle to the perpendicular referred to, so that the arc of its movement, while commencing substantially in line with the direction of power transmission or at an angle thereto of less than 90 degrees, will gradually assume a direction at a greater angle thereto, while the other leg extends from said point of transmission to the point at which power is applied, which latter is in a radius which, in the operation of the brake, may sweep across the perpendicular to the line of transmission and thus develops an arc of movement which is mainly coincident with the direction of power transmission. The lever is rendered duplex by providing two symmetrically deflected members on opposite sides of its fulcrum.

In the accompanying drawing, Figure 1 is a side elevation of a double-truck brake system in which the present invention may be advantageously employed, and Fig. 2 is a plan view of the brake rigging.

1, 1ª, represent brake rods adapted to be connected to the brakes to be applied, as for instance through the medium of chains 1ᵇ, 1ᶜ, or other flexible means and the yokes 2, 2ª which receive at their ends, the brake levers 3, 3ª connected with the brake shoes 4, 4ª; and 5, 5ª represent draft rods through which to apply the braking power, developed at any suitable source, as for instance the winding staffs 6, 6ª and flexible connections 7, 7ª.

The subject of the present invention consists of a new form of lever for transmitting the braking power, as for instance, from a draft rod 5 to a brake rod 1, or communicating power between a plurality of such rods. For this purpose, I employ a lever, such for instance as the lever 8 having a fulcrum 9, with a hub or cylindrical flange at 9ᵇ, a power transmitting point 10 receiving the brake connection, as for instance the chain 1ᵇ of rod 1, and a power receiving point 11, receiving the applying connection, as for instance rod 5. The purpose of this construction is to prevent the occurrence of a dead center when the brake is applied so that the chains 1ᵇ, 1ᶜ will be wound around the hub part 9ᵇ, providing a leverage of constant radius.

The lever 8 is so constructed that the radius of its power receiving point at the time of application of full braking pressure will be approximately perpendicular to the direction in which power is applied to it, while the radius of its power transmitting point is at the same time at a considerable angle to the direction in which power is transmitted from it. To these ends, when the lever is of the second order as shown and when the directions in which the lever receives and transmits its power are approximately parallel, the level is deflected so as to provide two legs, namely, one extending from the fulcrum in such direction as to establish the transmission point in a radius at a considerable angle to the perpendicular, and the other extending from transmission point 10 in such direction as to bring the receiving point back into the perpendicular or approximately so.

When movement is imparted to lever 8, the radius of receiving point 11 sweeps up to or across the perpendicular to the direction of application of power and full efficiency of the power is maintained; but in this movement, the arc of point 10 starts from a position in which it is enabled to promptly take up slack in the connections, but by the time the brake shoes have begun to press the wheels, the point 10 has reached the portion of its arc of movement where a great increase of pressure develops. By symmetrically but oppositely deflecting ends 8, 8$^a$ of a longer lever and thereby duplicating the conditions described, on opposite sides of the fulcrum, transmission point 10$^a$ and receiving point 11$^a$ are provided for operating rod 5$^a$ and brake rod 1$^a$, and the lever is thus made to realize the advantages referred to, in a duplex brake system capable of serving two sets of wheel brakes simultaneously, and of being operated from either end of the car at will. In such an arrangement, the particular operating rod (5 or 5$^a$) utilized, operates on one brake rod with a leverage of second order and on the other brake rod with an equal leverage of the first order. To equalize braking pressure at opposite ends of such duplex system, fulcrum 9 has bearing in a slotted hanger 9$^x$ so that lever 8, 8$^a$ is floating.

I claim:—

1. In a car brake lever fulcrumed in the car; a draft rod hinged at the extreme end of said lever and suitably operated from the car, said extreme end of the lever situated to travel toward the perpendicular between the draft rod and said fulcrum during action; a power transmitting member journaled to said lever on one side of its fulcrum, the portion of said member adjacent said lever being flexible; a hub on said lever coaxial with said fulcrum; the journal point for said member being situated radially removed from said hub and in a position to travel away from the perpendicular between said draft rod and said fulcrum the flexible portion of said member being wound around said hub during the latter part of action.

2. In a car brake an S-shaped lever fulcrumed at its center in the car; a draft rod hinged at each of the extreme ends of said lever and suitably operated from the car, said extreme ends of the lever situated to travel toward the perpendicular between the draft rods during action; a pair of power transmitting members journaled to said S-shaped lever symmetrically on either side of its fulcrum, the portion of said members adjacent said lever being flexible; a central hub on said lever coaxial with said fulcrum; the journal points for said members being situated radially removed from said hub and in a position to travel away from the perpendicular between said draft rods, and the flexible portion of said members being wound around said hub during the latter part of action.

The foregoing specification signed at Brooklyn, New York, this 8th day of January, 1913.

STONEWALL TOMPKINS.

In presence of two witnesses—
K. A. RILEY,
R. A. PAINE, Jr.